(12) United States Patent
Stoppek et al.

(10) Patent No.: US 6,431,051 B1
(45) Date of Patent: Aug. 13, 2002

(54) CLOSED CAVITY HYDRAULIC PISTON AND METHOD OF MAKING THE SAME

(75) Inventors: Robert J. Stoppek, Ames, IA (US); Mark A. Landwehr, Cicero, IN (US); Jay H. Ankeny, Emmetsburg; Allan R. Schuster, Spencer, both of IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/540,290

(22) Filed: Mar. 31, 2000

(51) Int. Cl.$^7$ .................................................. F01B 3/00
(52) U.S. Cl. ............................... 92/71; 92/157; 92/260
(58) Field of Search ........................... 92/71, 157, 172, 92/176, 181 R, 260, 187

(56) References Cited

U.S. PATENT DOCUMENTS

| | | | |
|---|---|---|---|
| 1,714,145 A | * 5/1929 | Sperry | 92/181 R |
| 3,187,644 A | 6/1965 | Ricketts | |
| 3,212,483 A | * 10/1965 | Balzer | 92/187 |
| 3,319,575 A | 5/1967 | Havens | 92/255 |
| 3,707,113 A | 12/1972 | Hein et al. | |
| 3,741,077 A | 6/1973 | Hulsebus et al. | |
| 3,882,762 A | 5/1975 | Hein | |
| 3,896,707 A | 7/1975 | Holmstrom | |
| 3,915,074 A | 10/1975 | Bristow et al. | |
| 3,984,904 A | 10/1976 | Schlecht | |
| 3,986,439 A | 10/1976 | Ring | |
| 3,999,468 A | 12/1976 | Bristow et al. | |
| 4,191,095 A | 3/1980 | Heyl | |
| 4,216,704 A | 8/1980 | Heyl | |
| 4,494,448 A | 1/1985 | Eystratov | |
| 4,519,300 A | 5/1985 | Adomis, Jr. et al. | |
| 5,007,332 A | 4/1991 | Wagenseil | |
| 5,072,655 A | 12/1991 | Adler | |
| 5,076,148 A | 12/1991 | Adler | |
| 5,216,943 A | 6/1993 | Adler et al. | |
| 5,265,331 A | 11/1993 | Engel et al. | 29/888 |
| 5,490,446 A | 2/1996 | Engel | |
| 5,553,378 A | 9/1996 | Parekh et al. | |
| 5,642,654 A | 7/1997 | Parekh et al. | |
| 5,765,464 A | * 6/1998 | Morita | 92/172 |

OTHER PUBLICATIONS

Erickson et al, "Injection Molding" in: Metals Handbook, Ninth Edition, vol 7 (Ohio, American Society of Metals, 1984), pp 495–500, Ref TA 472.A3.*

* cited by examiner

Primary Examiner—F. Daniel Lopez

(57) ABSTRACT

A hydraulic piston for a cylinder block of a hydrostatic power unit has an elongated cylindrical body with first and second ends. An elongated cavity is formed in the body. A cap is adhered to the body to close the cavity. The cap has an external shape to facilitate the operative engagement thereof with a slipper, which is in subsequent engagement with a swashplate mounted adjacent the cylinder block. The piston has an elongated first conduit formed in the body which is separate from the cavity and extends between the opposite ends thereof. The conduit terminates in registering communication with a second conduit in the cap thereof to permit transmission of oil through the conduit without invading the volume of the cavity. The cap preferably has a tapered surface on the inner end thereof engaging a compatible shaped surface on an adjacent end of the body to center and align the cap with the body. The tapered surfaces of the cap and body terminate in parallel wall surfaces to create a continuous arcuate interface therebetween which is filled with an adhesive material such as a brazing medium. The body member and the cap are of metallic construction with the material of the cap member being more malleable than the material of the body so as to permit subsequent crimping of the cap as may be required. The body and the cap are preferably formed by a metal injecting molding process utilizing a molding material comprised at the time of molding of a mixture of metallic grains and a binder. The body member and the cap are subjected to a debinding process whereupon the binder material is removed from the molding material and the components are sintered whereupon controlled shrinking occurs. The cap is adapted to terminate either in a spherical ball for attachment to a slipper element, or is comprised of a spherical socket adapted to receive a ball element attached to a slipper element.

14 Claims, 7 Drawing Sheets

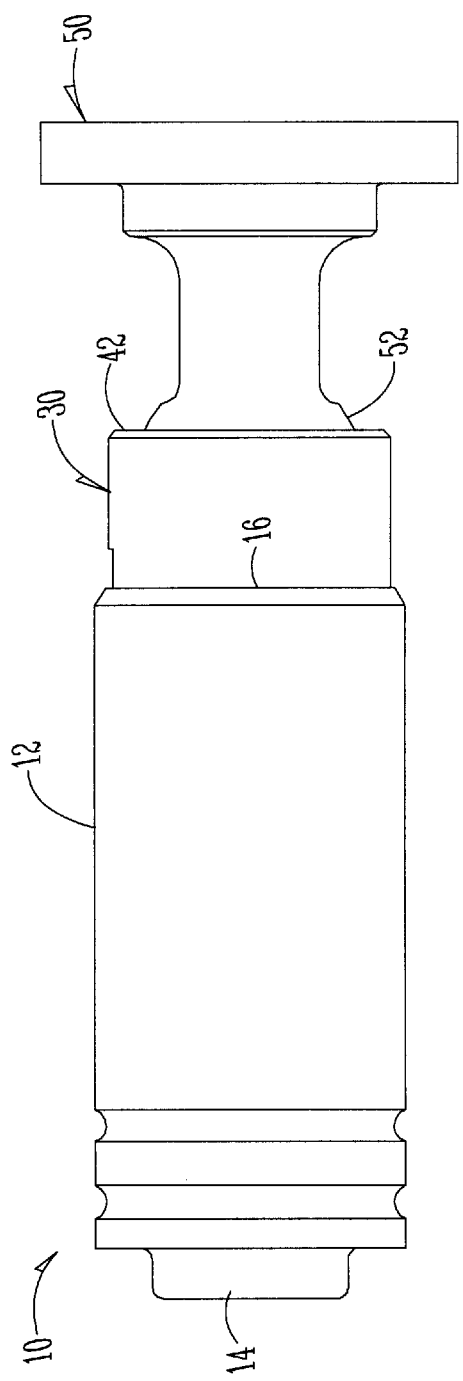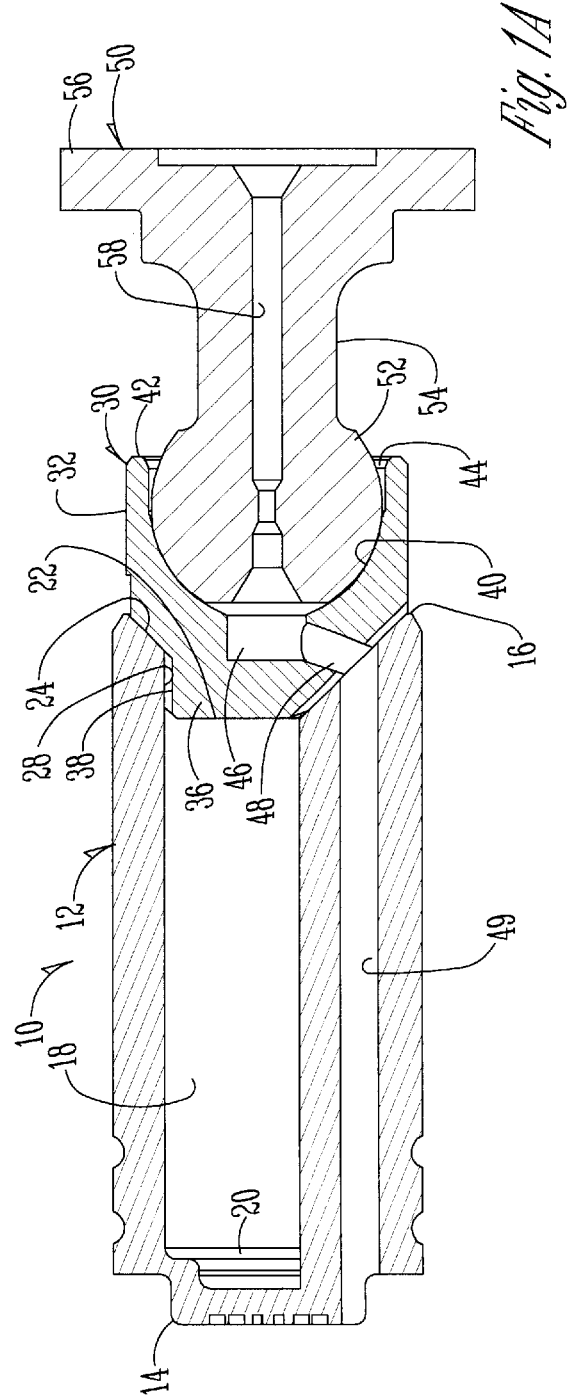
Fig. 1
Fig. 1A

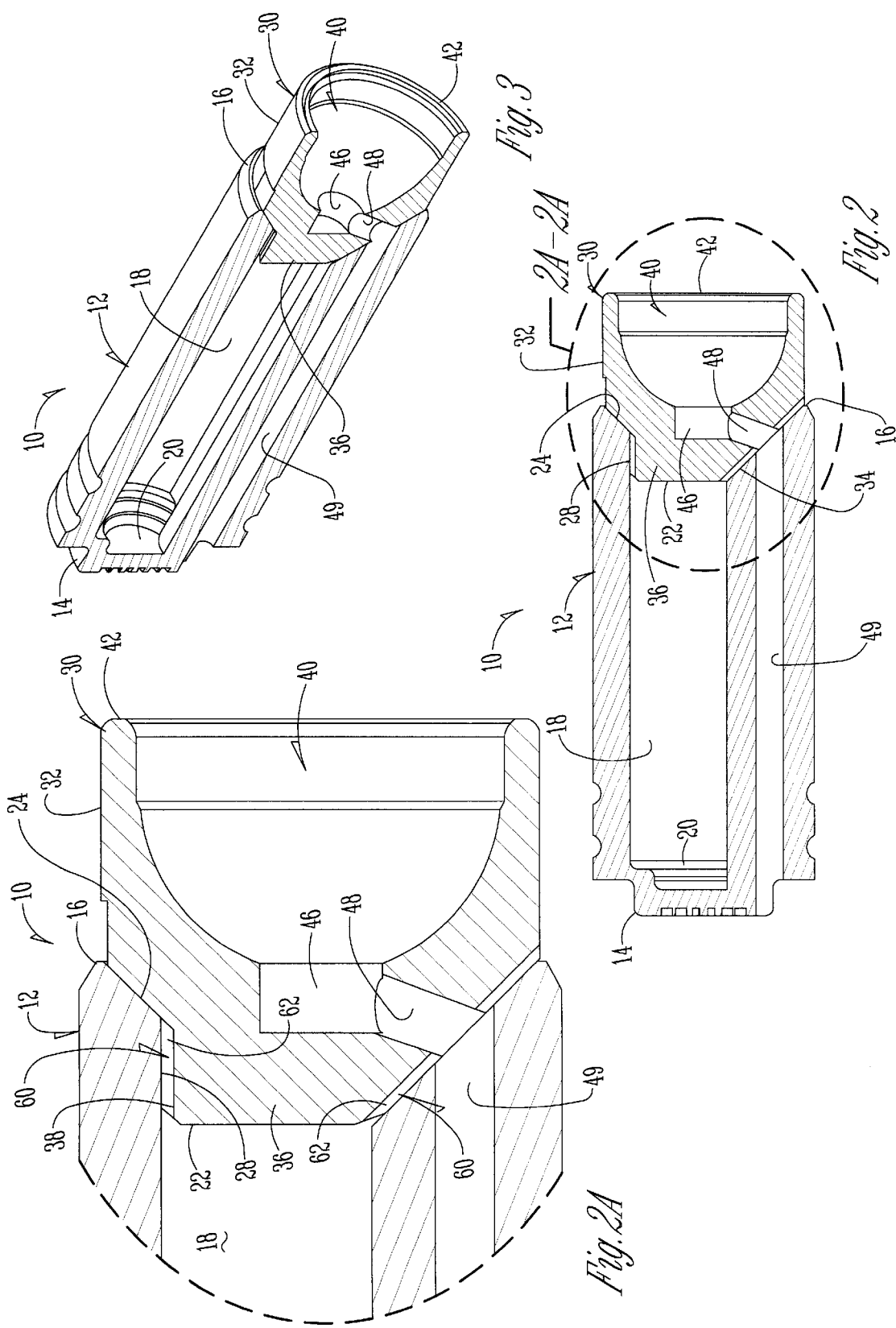

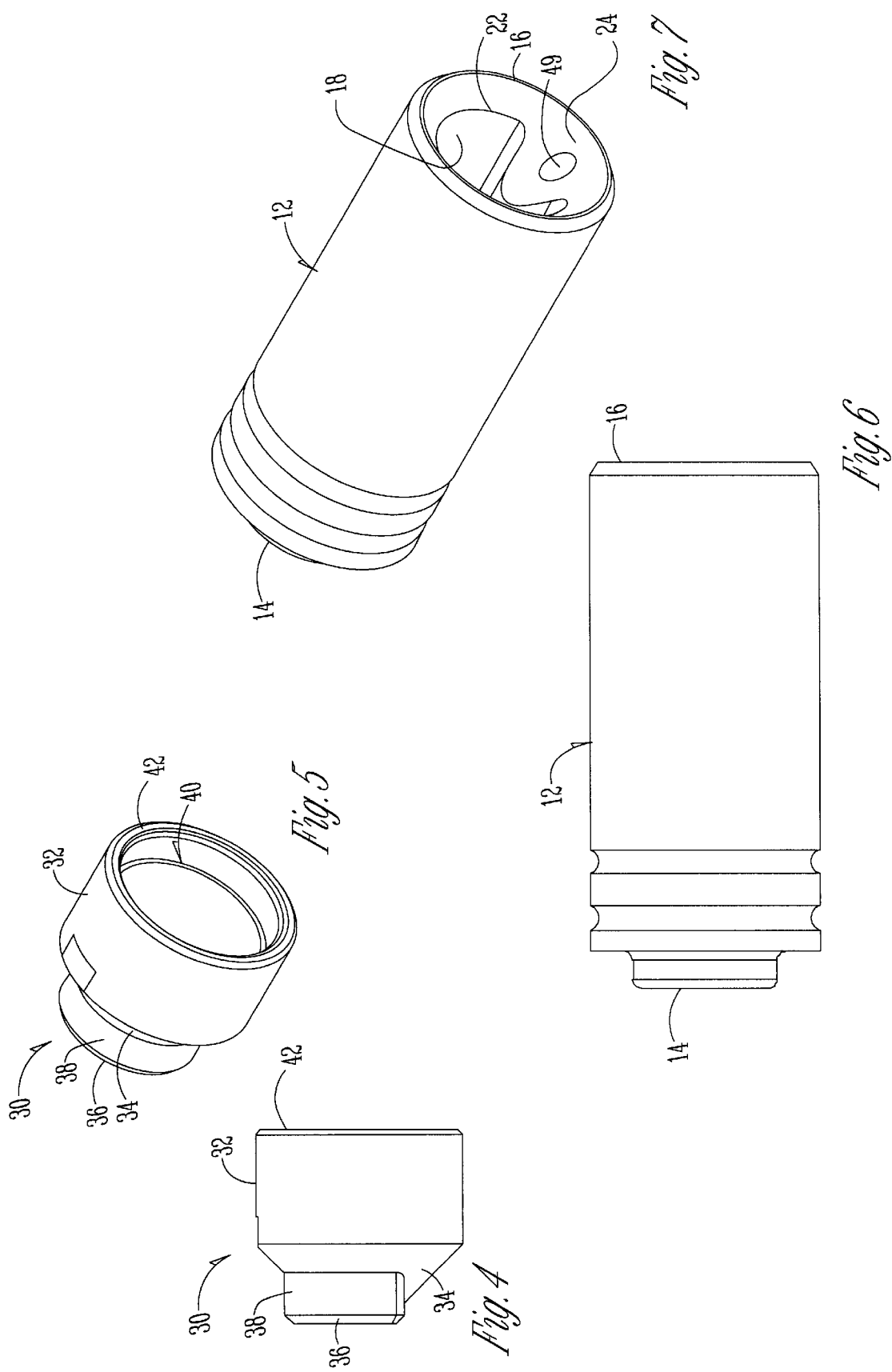

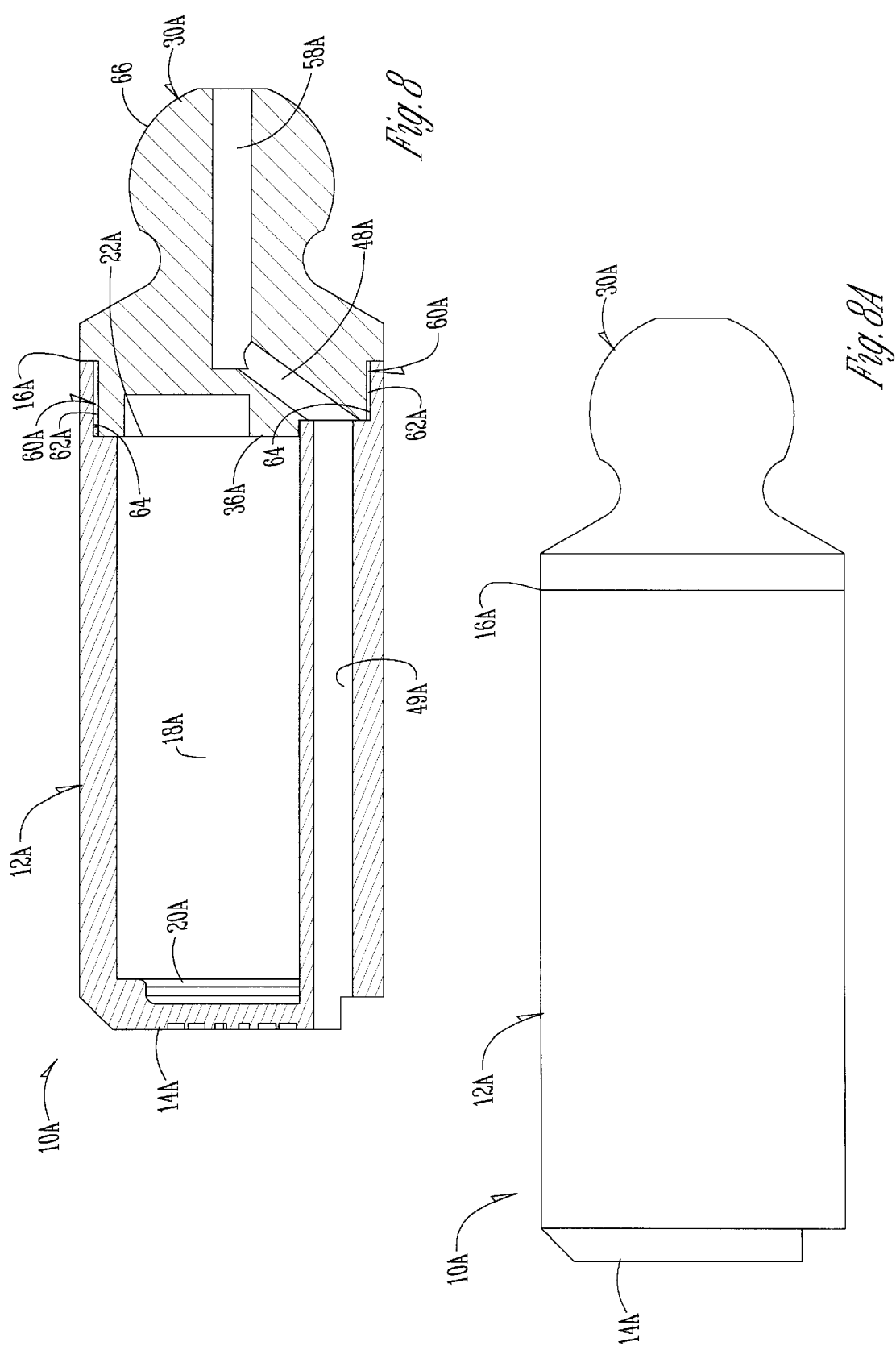

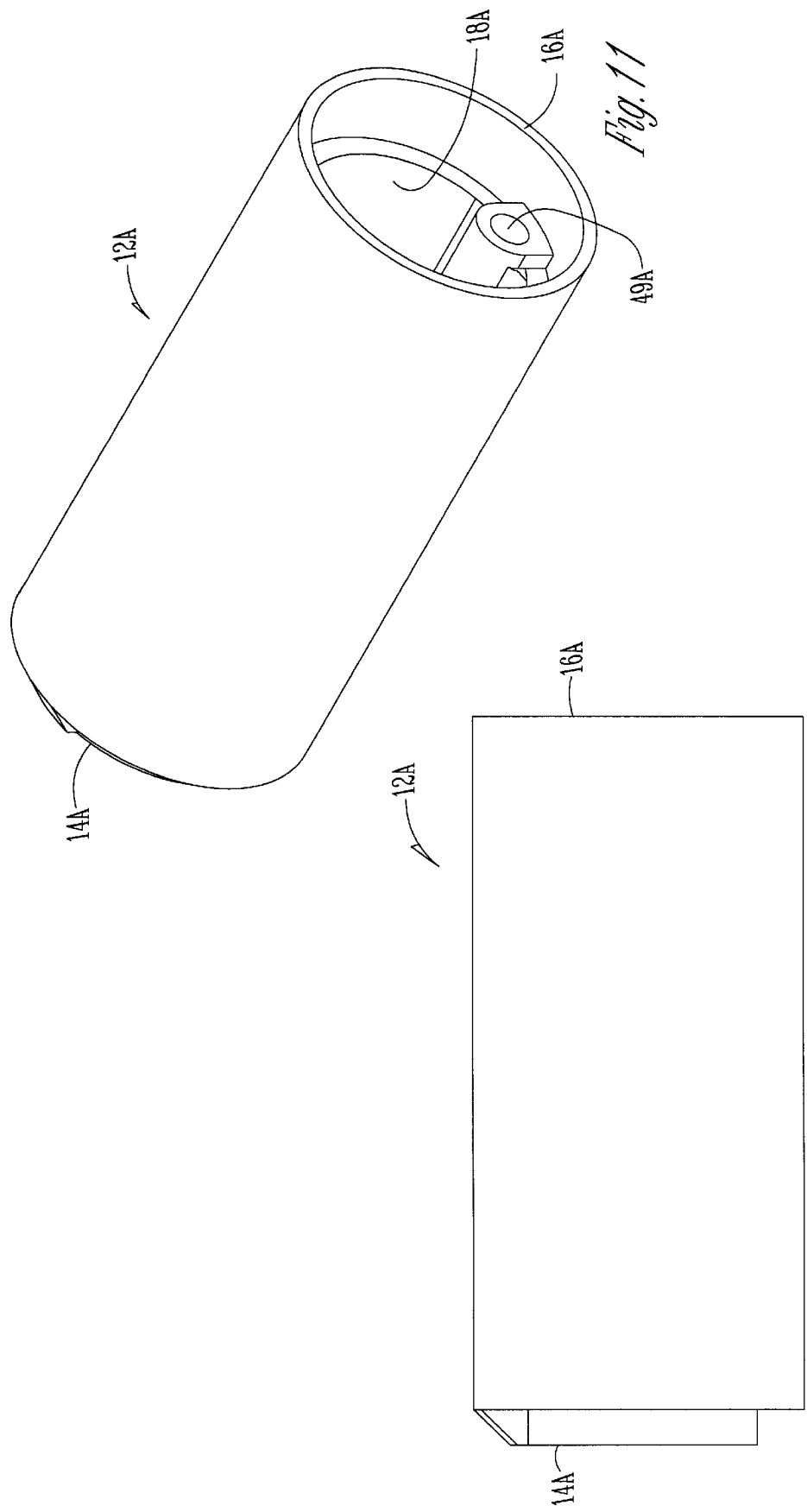

CLOSED CAVITY HYDRAULIC PISTON AND METHOD OF MAKING THE SAME

BACKGROUND OF THE INVENTION

Some hydraulic pistons used in a cylinder block of a hydrostatic power unit are of solid steel construction. While they are durable, reliable, and inexpensive to make, their relative greater weight imposes limitations on their speed of operation. They also develop more operational frictional forces.

Alternatively such pistons are constructed with a hollow cavity therein to reduce the weight of the solid steel pistons. However, the hollow cavities become filled with oil which is compressible. The resulting compression and de-compression of the oil within the piston cavity during pressure cycles results in inefficient energy consumption and has an adverse affect on the moments of inertia imposed on the swashplate with which the pistons interact.

The shortcomings of the hollow pistons are overcome in part by pistons which fill the hollow cavity with a plastic material which is lightweight and which is not as compressible as oil. However, it is difficult to get reliable material that can endure the harsh environment of the pistons whereupon deterioration of the plastic material is common. Aluminum slugs in the cavity instead of the plastic material are more durable, but they are difficult to retain within the cavity.

Some pistons provide a hollow cavity with a cap on one end to close the cavity. Oil does not dwell within the cavity because a hollow tube extends through the piston and through the cavity to prevent the cavity from becoming filled with oil. The tubes within the cavity are often reinforced by a washer or the like which spans the distance from the outer diameter of the tube to the inner diameter of the cavity. While pistons of this design solve at least some of the problems outlined heretofore, they are very expensive to make.

Therefore, a principal object of this invention is to provide a closed cavity hydraulic piston and a method of making the piston which is economical of manufacture and which overcomes the above-described shortcomings of existing pistons.

More specifically, it is an object of this invention to provide a closed cavity hydraulic piston which has a hollow piston body with a piston cap thereon which are both formed by a metal injection molding process.

A further object of this invention is to provide a closed cavity hydraulic piston and method of manufacture which provides for adhering the cap to the piston body while simultaneously hardening the piston body and leaving the cap malleable for crimping or swaging.

A further object of this invention is to provide a closed cavity hydraulic piston wherein oil conduits are formed in the piston body and the cap separate from the cavity wherein the cap is adhered to the piston body for closing the cavity and wherein the cap is self-aligned with the piston body by reason of complementary engagement surfaces on the cap and the piston body.

A still further object of this invention is to provide a closed cavity hydraulic piston and method of making the same which will essentially eliminate finishing operations through the fabrication of the body and the cap by a metal injection molding process.

A still further object of the invention is to provide a hydraulic piston which is quiet in operation, capable of being operated at high speeds, energy efficient in operation, and inexpensive of manufacture.

These and other objects will be apparent to those skilled in the art.

SUMMARY OF THE INVENTION

A hydraulic piston for a cylinder block of a hydrostatic power unit has an elongated cylindrical body with first and second ends. An elongated cavity is formed in the body. A cap is adhered to the body to close the cavity. The cap has an external shape to facilitate the operative engagement thereof with a slipper which is in subsequent engagement with a swashplate mounted adjacent the cylinder block The piston has an elongated first conduit formed in the body which is separate from the cavity and extends between the opposite ends thereof. The conduit terminates in registering communication with a second conduit in the cap thereof to permit transmission of oil through the conduit without invading the volume of the cavity.

The cap preferably has a tapered surface on the inner end thereof engaging a compatible shaped surface on an adjacent end of the body to center and align the cap with the body. The tapered surfaces of the cap and body terminate in parallel wall surfaces to create a continuous arcuate interface therebetween which is filled with an adhesive material such as a brazing medium.

The body member and the cap are of metallic construction with the material of the cap member being more malleable than the material of the body member so as to permit subsequent crimping of the cap as may be required.

The body and the cap are preferably formed by a metal injecting molding process utilizing a molding material comprised at the time of molding of a mixture of metallic grains and a binder material. The body member and the cap are subjected to a de-binding process whereupon the binder material is removed from the molding material and the components are then sintered, whereupon controlled shrinking occurs.

The cap is adapted to terminate either in a spherical ball for attachment to a slipper element, or is comprised of a spherical socket adapted to receive a ball element attached to a slipper element.

BRIEF DESCRIPTION OF THE DRAWINGS

FIG. 1 is a side elevational view of the piston of this invention showing a female socket to receive a ball on a slipper element;

FIG. 1A is a longitudinal sectional view of the device of the piston of FIG. 1;

FIG. 2 is a longitudinal sectional view of the piston body of FIG. 1A;

FIG. 2A is an enlarged scale sectional view taken on line 2A—2A of FIG. 2;

FIG. 3 is a perspective view of the piston of FIG. 2 cut along its center line to more fully illustrate its construction;

FIG. 4 is a side elevational view of the cap of the piston of FIG. 1;

FIG. 5 is a perspective view of the cap of FIG. 4;

FIG. 6 is a side elevational view of the piston body of FIG. 1;

FIG. 7 is a perspective view of the piston body of FIG. 6;

FIG. 8 is a longitudinal sectional view of the piston of FIG. 8A;

FIG. 8A is a side elevational view of an alternate form of a piston with a male connector formed as part of the head thereof;

FIG. 10 is a side elevational view of the piston body of FIG. 8;

FIG. 11 is a perspective view of the piston body of FIG. 10;

DESCRIPTION OF THE PREFERRED EMBODIMENT

Figure 9:
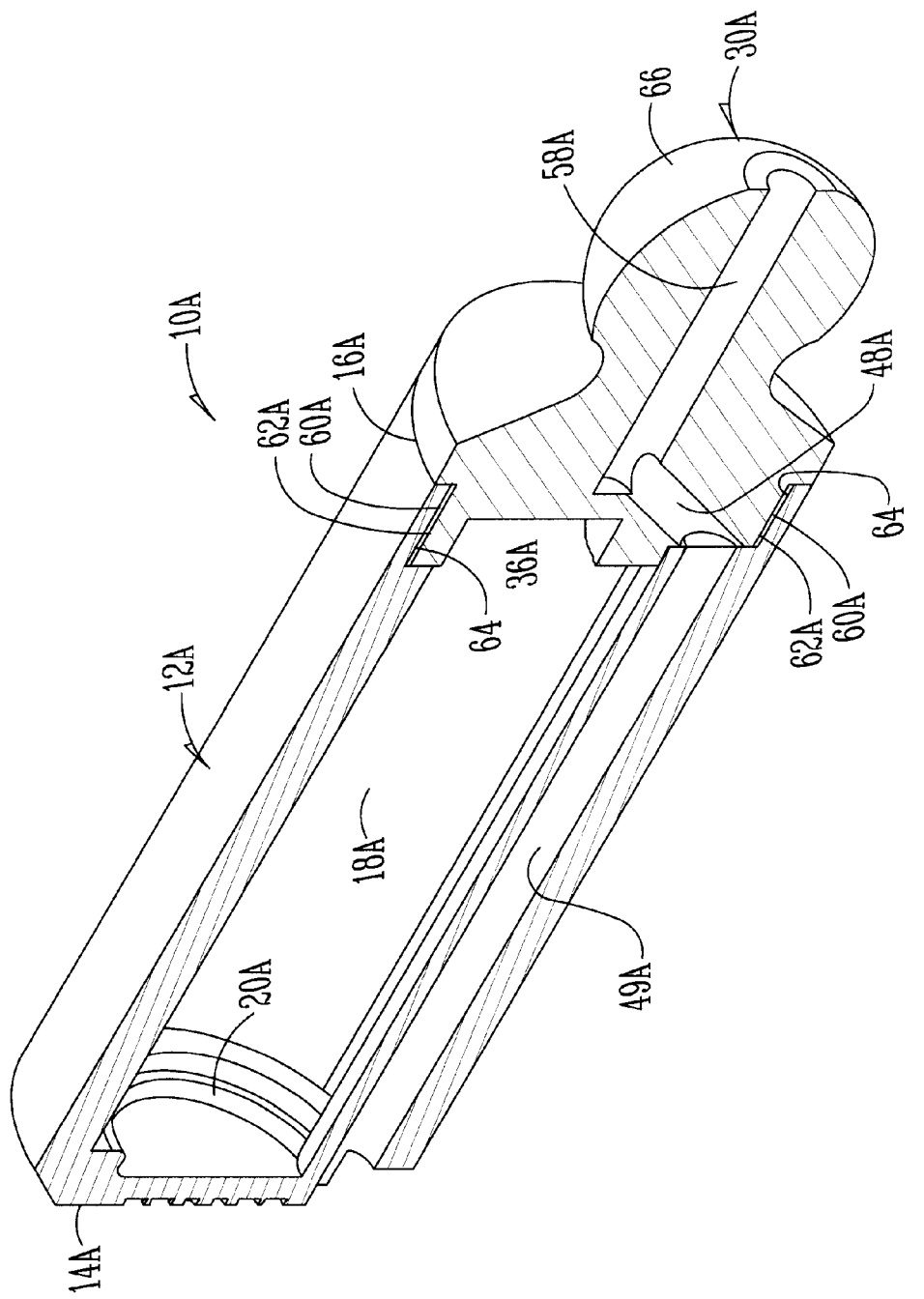
FIG. 9 is a perspective view of the piston of FIG. 8A cut along its center line to more fully illustrate its construction.

With reference to FIGS. 1–7, the numeral 10 designates a hydraulic piston which has a cylindrical body 12 having a first end 14 and a second end 16. An elongated cavity 18 is formed within body 12 and has a first end 20 and a second end 22. A tapered surface 24 is formed in body 12 around the second end 22 of cavity 18. With reference to FIG. 2A, a cylindrical sidewall portion 28 extends inwardly from the inner tapered surface 24.

A cap 30 has a cylindrical head 32 and a tapered sidewall 34 (FIG. 4). A cylindrical stub 36 extends inwardly into the second end 22 of cavity 18. The stub 36 has a cylindrical sidewall 38 that extends into the end 22 of cavity 18.

Cap 30 has an arcuate socket 40 which terminates in an annular lip 42 as best shown in FIG. 1A. A small space 44 will accommodate the crimping of lip 42 in an inward direction as will be discussed hereafter.

Cap 30 has a center conduit 46 which registers with a diagonal conduit 48 which registers with and communicates with an elongated conduit 49 in body 12. Conduit 49 extends between the first and second ends 14 and 16, respectively, and is fluidly separate from the cavity 18.

A slipper 50 has a conventional ball 52 on one end which is connected by stem 54 to a flat slipper surface 56. A center conduit 58 extends through slipper 50 and communicates with center conduit 46 in cap 30.

As best shown in FIG. 2A, an annular interface 60 extends between tapered surface 34 of cap 30, and tapered surface 24 of body 12. An adhesive material 62 is placed in interface 60, as will be described hereafter, to secure the cap 30 to the body 12.

With references to FIGS. 2A and 4, the assembly of the piston 10 involves placing an adhesive material, such as a brazing medium 62. The tapered surface 24 of body 12 and the tapered surface 34 of cap 30 are complementary in shape and serve to center the cap with respect to the body 12. The cylindrical stub 36 serves to close the end 22 of cavity 18. The use of the adhesive material 62, as described hereafter, also serves to rigidly secure and fluidly seal the cap 30 to the body 12 to create the assembled piston 10.

The slipper 50 is operationally secured to the cap 30 by inserting the ball 52 of the slipper 50 into the arcuate socket 40. The lip 42 on cap 30 is then crimped inwardly to envelop the space 44 (FIG. 1A) to prevent the longitudinal separation of the slipper 50 from the socket 40. The crimping operation is conventional and serves only to prevent the longitudinal separation of the parts, as described above, but does not rigidly lock the ball 52 within the socket 40. Thus, the assembly of FIG. 1A unites the body 12, the cap 30, and the slipper 50.

DESCRIPTION OF THE SECOND EMBODIMENT

Figure 13:
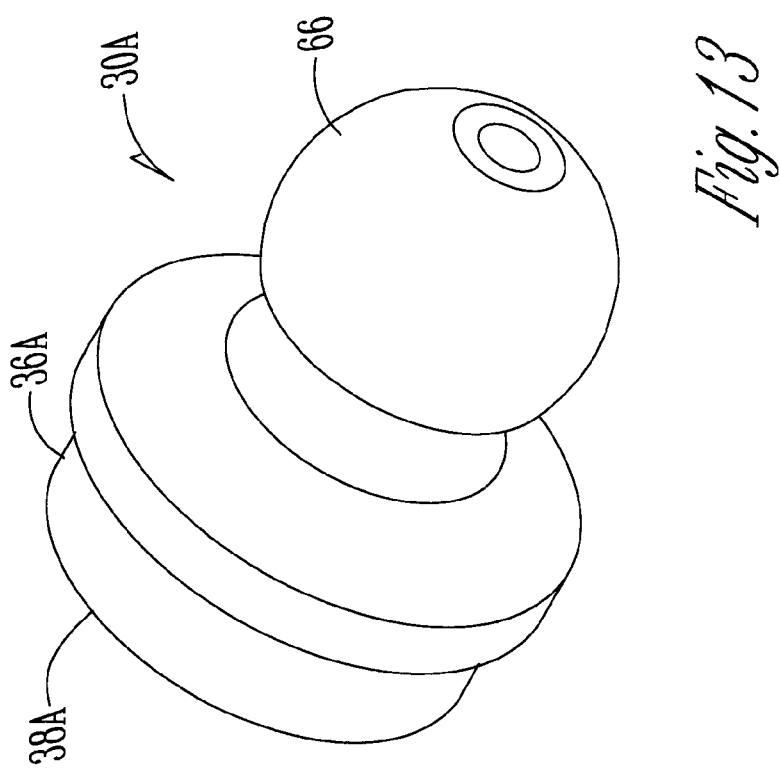
FIG. 13 is a perspective of the cap of FIG. 12.
Figure 12:
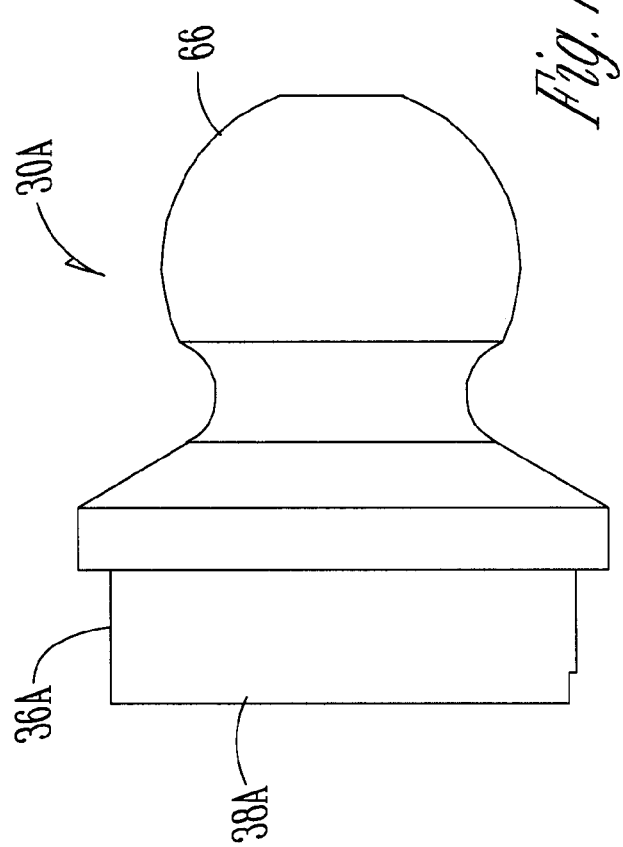
FIG. 12 is a side elevational view of the cap of FIG. 8.

With reference to FIGS. 8–13, the parts of the components of these figures which correspond to similar or identical parts of the embodiment of FIGS. 1 through 7 are identified with identical numerals followed by "A". Thus, for example, the conduit 49 in FIG. 1A is essentially the same conduit as 49A shown in FIG. 8. Whereas FIGS. 1–7 show a piston 10 having a female socket in the cap 30, the cap 30A in FIGS. 8–13 show a male connector comprised of ball 66 (FIG. 8). The conduit 58A in ball 66 connects with conduit 48A which in turn is connected to conduit 49A in essentially the same manner that the conduit 58 in slipper 50 is connected to the conduits 48 and 49 in FIG. 1A.

A cylindrical socket 64 is formed at the end 22A of cavity 18A (FIG. 8). The cylindrical stub 36A extends into socket 64. The space 60A resulting from the differences in diameter of the stub 36A and the socket 64 is used to receive adhesive material 62A for purposes of securing the cap 30A to the body 12A in the same manner that cap 30 was secured to the body 12 in FIG. 1A.

THE BODY AND CAP OF THE PISTONS IN THE DESCRIPTION OF FORMING FIRST AND SECOND EMBODIMENTS

The bodies 12 and 12A and caps 30 and 30A, according to this invention, are created by a process known as metal injection molding ("MIM"). This process is known in the metallurgical arts, but has not had application to the formation of hydraulic pistons. The bodies 12 and 12A and the caps 30 and 30A may be produced from different materials. For example, the caps and piston bodies will be made from a low (AISI 1008 or 1010) and medium (AISI 4140) carbon steel, respectively. The caps and the bodies can be joined through a batch brazing operation at temperatures where the piston body can be hardened by quenching to create wear properties, and the cap remains relatively malleable for the crimping operation discussed heretofore. The MIM process contemplates mixing fine grains of metal with a suitable binder. The bodies and caps would be molded in the shapes shown in the drawings. A typical system would involve assembling the two components using a braze media for the adhesive material 62. An appropriate material would be NICROBRAZ® 110 (U.S. Pat. No. 5,183,636). As previously discussed, the cap will be centered on the body by reason of the complementary-shaped tapered surfaces of each. The tapered surfaces of 24 and 34 of FIGS. 1–7 can be incorporated in the structure of FIGS. 8–13 to utilize the centering and alignment features of the body 12A and cap 30A. The assembled components would be brazed at a temperature of approximately 2050° F. in a controlled atmosphere or vacuum; cooled to 1550° F. to solidify the brazed medium; heat applied to stabilize the temperature at 1550° F.; components may be quenched in gas, water, polymer or oil; washing the components (not required if vacuum brazed and gas quenched); and then tempering at a temperature of 350–400° F.

This process and design produces a piston that includes the following finished features: socket size and finish; balance groove; and hole through the piston. This process eliminates all expensive finishing operations.

What is claimed is:

1. A piston for a cylinder block of a hydrostatic power unit, comprising:
    an elongated cylindrical body having first and second ends,
    an elongated cavity in the body with first and second ends with the second end thereof being open and terminating within a transverse plane passing through the second end of the body, a cap formed separately from the body and secured to and closing the second end of the cavity to seal and close the cavity, the cap having an external shape to facilitate the operative engagement thereof with a slipper engaged with a swashplate mounted adjacent the cylinder block, wherein the cap has a tapered surface on the inner end engaging a compatibly shaped surface on the second end of the body to center and align the cap with the body, wherein the tapered surfaces of the body and the cap align center axes of the body and the cap, wherein the tapered surfaces of the cap and the body terminate in parallel wall surfaces to create a continuous arcuate interface therebetween, and an adhesive material inserted in the arcuate interface to rigidly secure the cap to the body.

2. The piston of claim 1 wherein the adhesive material is a brazing medium, and the body and cap are brazed together in rigid engagement by brazing.

3. A piston for a cylinder block of a hydrostatic power unit, comprising:

an elongated cylindrical body having first and second ends, an elongated cavity in the body with first and second ends with the second end thereof being open and terminating within a transverse plane passing through the second end of the body, a cap formed separately from the body and secured to and closing the second end of the cavity to seal and close the cavity, the cap having an external shape to facilitate the operative engagement thereof with a slipper engaged with a swashplate mounted adjacent the cylinder block, wherein the body and the cap are comprised of a metallic material, and wherein the metallic material of the cap is more malleable than the material of the body.

4. A method of making a piston for a cylinder block of a hydrostatic power unit, comprising:

combining a quantity of small steel grains with a quantity of binder to create a first molding material, forming out of the first molding material an elongated single-piece cylindrical body having opposite first and second ends, a bottom wall adjacent the first end and a continuous sidewall, the body further including an elongated cavity formed longitudinally therein having a closed first end delimited by the bottom wall and an opposite open second end terminating within a transverse plane passing through the second end of the body, combining a quantity of small steel grains with a quantity of binder to create a second molding material, forming out of the second molding material a cap having a compatible shape for fitting on the body to close an open end of the cavity, with the cap having an external shape to facilitate the operative engagement thereof with a slipper and subsequent engagement with a swashplate mounted adjacent the cylinder block, wherein the steel grains used for creating the first molding material are different than the steel grains used for creating the second molding material such that the cap is more malleable than the body, removing the binder from the first and second molding materials, sintering and shrinking the body and the cap proportionally so that the cap can is able to be fitted on the body, fitting the cap on the body to close the cavity in the body, and adhering the cap to the body.

5. The method of claim 4 wherein an elongated conduit is formed in the body separately from the cavity and is placed in registering position with one end of a conduit in the cap when the cap and body are fitted together.

6. A piston for a cylinder block of a hydrostatic power unit, comprising:

a single-piece elongated cylindrical body having opposite first and second ends, a bottom wall adjacent the first end and a continuous side wall extending from the bottom wall toward the second end, the body including an elongated cavity formed longitudinally therein, the cavity having a closed first end delimited by the bottom wall and an opposite open second end terminating within a transverse plane passing through the second end of the body, a cap formed separately from the body and secured to and closing the second end of the cavity to seal and close the cavity, the cap having an external shape to facilitate the operative engagement thereof with a slipper engaged with a swashplate mounted adjacent the cylinder block; and wherein the body has a central longitudinal axis and the elongated cavity has a central longitudinal axis, the central longitudinal axis of the cavity being offset from and parallel to the central longitudinal axis of the body.

7. The piston of claim 6 wherein an elongated first conduit is formed in the body separate from the cavity and extending between the ends of the body, and having first and second ends with the second end of the conduit terminating adjacent the second end of the cavity, a second conduit formed in the cap with an end registering with the second end of the conduit in the body.

8. The piston of claim 6 wherein the cap has a tapered surface on the inner end engaging a compatibly shaped surface on the second end of the body to center and align the cap with the body.

9. The piston of claim 8 wherein the tapered surfaces of the body and the cap align center axes of the body and the cap.

10. The piston of claim 6 wherein the body is comprised of a metallic material.

11. The piston of claim 6 wherein the body and the cap are comprised of a metallic material.

12. The piston of claim 6 wherein the body and cap are formed by metal injection molding.

13. The piston of claim 6 wherein the cap has an external female cavity to receive a spherical male slipper element for engaging a swash plate.

14. The piston of claim 6 wherein the cap has an external spherical male member for receiving the female cavity of a slipper element for engaging a swash plate.

* * * * *